(12) United States Patent  
Sevcik

(10) Patent No.: US 6,496,861 B1
(45) Date of Patent: Dec. 17, 2002

(54) OPERATIONAL ENVIRONMENT SYSTEM AND METHOD FOR COMMUNICATION NETWORK SERVICE APPLICATIONS

(75) Inventor: Maximilian Sevcik, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/043,253

(22) PCT Filed: Sep. 3, 1996

(86) PCT No.: PCT/EP96/03865

§ 371 (c)(1),
(2), (4) Date: Mar. 13, 1998

(87) PCT Pub. No.: WO97/10683

PCT Pub. Date: Mar. 20, 1997

(30) Foreign Application Priority Data

Sep. 15, 1995 (EP) .............................................. 95114576

(51) Int. Cl.[7] ............................................ G06F 15/173
(52) U.S. Cl. ..................... 709/224; 709/202; 709/223; 709/318; 709/328; 714/100; 714/4
(58) Field of Search ................................ 709/201–203, 709/220–226, 229, 318–319, 328–329; 714/2, 4–6, 100

(56) References Cited

U.S. PATENT DOCUMENTS

| 4,617,663 A | | 10/1986 | Lake et al. ................. 714/736 |
|---|---|---|---|
| 5,237,684 A | * | 8/1993 | Record et al. ............... 709/318 |
| 5,381,534 A | * | 1/1995 | Shi ............................. 709/203 |
| 5,572,676 A | * | 11/1996 | Bergler ....................... 709/328 |
| 5,751,964 A | * | 5/1998 | Ordanic et al. ............. 709/224 |
| 5,907,607 A | * | 5/1999 | Waters et al. ............... 379/207 |
| 5,956,489 A | * | 9/1999 | San Andres et al. ........ 709/221 |
| 6,338,088 B1 | * | 1/2002 | Waters et al. ............... 709/224 |

FOREIGN PATENT DOCUMENTS

EP    WO 95/05718    8/1995    ............ H04Q/1/24

OTHER PUBLICATIONS

SVEX: Switching Program Verification Expert System, Yamazaki et al., pp. 303.3.1/303.3.5, 1990.

Service Maintenance and Testing Strategy for Advanced Intelligent Network, Moharram et al., pp. 609/622, Feb. 14, 1994.

"Customer Control of Network Features", Raack et al., pp. 1/5, May 1984.

* cited by examiner

Primary Examiner—Bharat Barot
(74) Attorney, Agent, or Firm—Bell, Boyd & Lloyd LLC

(57) ABSTRACT

A Fault-tolerant Operational Environment system, and method, which makes it possible for network operators and third parties (for example, software houses) to implement their service ideas directly and without passing via the network suppliers, and at the same time to ensure that faulty Service Applications implemented in such a way have no negative effects. By an operational environment system (FOE) according to the invention.

12 Claims, 5 Drawing Sheets

API: Application Programming Interface

Legend:
tn: Timestamp of the periodic Application Activity Tests (AAT) at the time n
cn: Timestamp of the last context change in the application AAT period n
te: Timestamp of the last network input or network output event
$\triangle$: Threshold for the maximum processing time for a network event
L: Max. no. of repetitions of a network output event during a call

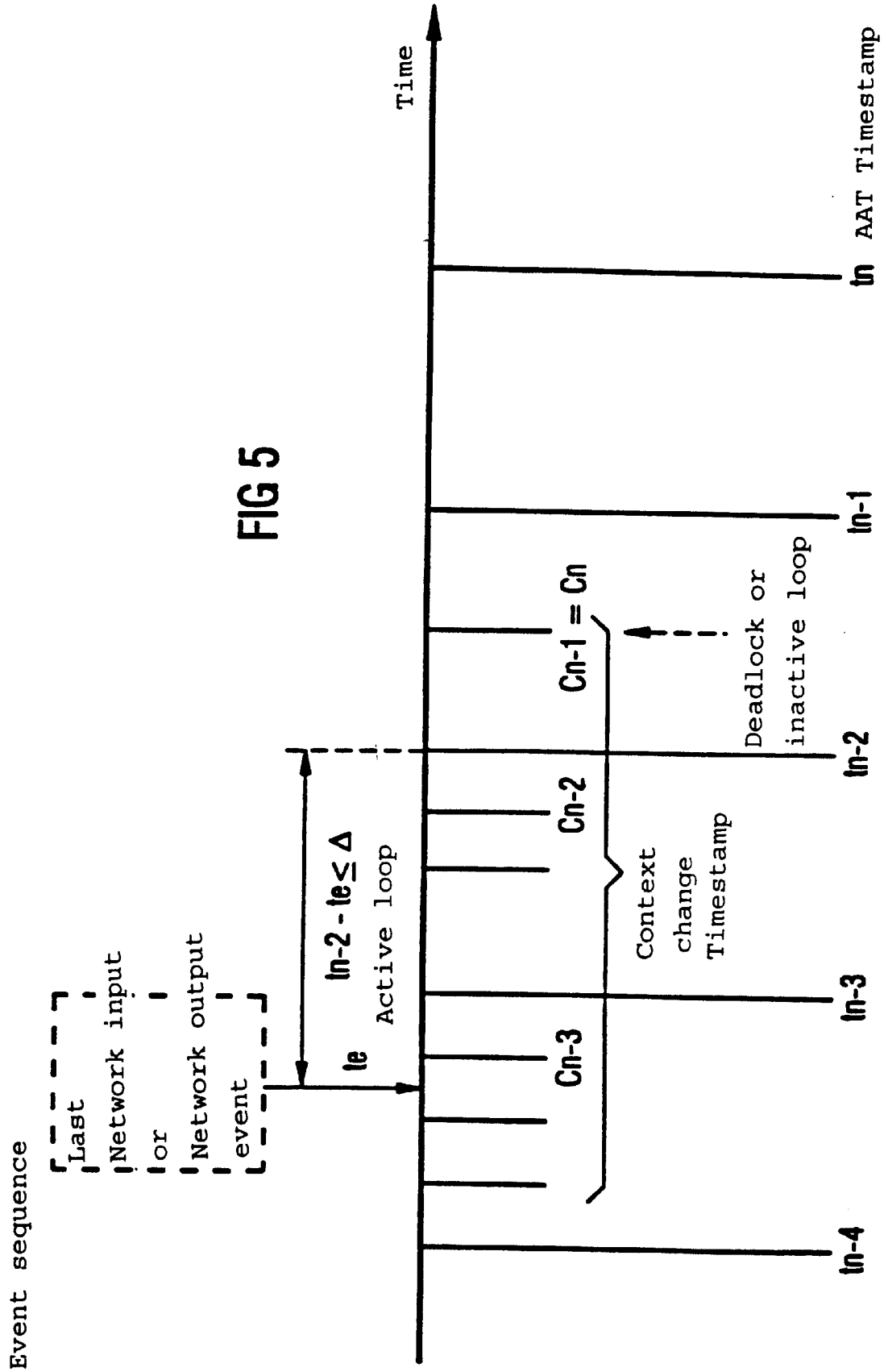

OPERATIONAL ENVIRONMENT SYSTEM AND METHOD FOR COMMUNICATION NETWORK SERVICE APPLICATIONS

BACKGROUND OF THE INVENTION

1. Field of the Invention

The present invention relates, generally, to operational environment systems and methods for communication network service applications and, more specifically, to an operational environment system and method which allows operators and third parties to implement service ideas directly into a communication network without having to pass through a network supplier and which ensures that faulty service applications implemented in such a way have no negative effects.

2. Description of the Prior Art

In present-day N-ISDN and B-ISDN telecommunications networks, Service Applications are provided as part of the known Intelligent Network (IN for short). FIG. 1 shows the architecture of the Intelligent Network. The Intelligent Network is intended to allow a network operator to introduce new services quickly and without any problems, and without having to take any actions relating to the installation program systems in each network node. Such actions in an IN are therefore limited to as few central network nodes, so-called Service Control Points SCP, as possible. These points, at a central point, are equipped with the appropriate application software for the new services, the so-called Service Applications, after which, by a type of "remote control", it is possible for the individual network nodes to implement the new services.

The remote-control network nodes of the IN are also called Service Access nodes or Service Switching Points SSP. They are connected to a Service Control Point SCP directly or via a signalling network, such as the CCS7 signalling network. A Service Management Point SMP is used by the network operator, the service provider and the service subscriber to administer the IN services.

A call to a service on the Intelligent Network may first of all be routed to a Service Switching Point SSP from a normal network node, that is to say a network node that is not remotely controlled by the SCP. The Service Switching Point uses the dialed number and/or the Service Code to determine which Service Control Point SCP contains the Service Application corresponding to this Service and then sends a request to this Service Control Point as to how it must process the call. Once the SCP has investigated the request, it sends a reply to the Service Switching Point, which reply contains information that the Service Switching Point requires to continue processing the call.

The Service Control Point SCP requires a hardware/software computer platform that is as fault-free as possible since the Service Applications must have the same high availability as the other components in the basic network (SSP and other switching centers). For this reason, the Service Applications are nowadays developed by the network suppliers' software specialists and are systematically tested, at high cost. All that the network operator can do is to modify, i.e. customize these Service Applications at the points provided for this purpose. Examples of such Service Applications include:

"green" numbers (freephone; toll-free numbers)

Virtual Private Network

It would therefore be desirable for Service Applications (in the SCP and, to some extent, in the SMP) to be programmed directly by the network operator or third parties; for example, software houses. In this way, network operators can implement their service ideas directly and without passing via the network suppliers (Open Network Provisioning: ONP). However, this capability involves a risk of the introduction of faulty Service Applications.

Although known fault-tolerant hardware techniques are known (N+1, 1:1 redundancy, microsynchrone systems), it is impossible to prevent serious logic faults when programming software in the way mentioned above, such may lead to the system applications crashing or behaving incorrectly in a dynamic situation. This normally causes a reaction on other Service Applications and/or on the basic network.

Examples of such logic faults include:

An event expected by a Service Application never occurs. The operation is blocked (deadlock).

A Service Application goes into an inactive loop (endless loop) in which sensible functions are no longer carried out.

A Service Application periodically carries out a message interchange with the basic network or with other SCP functions, but without carrying out any sensible network function (active loop). There is also a risk of system overload for other Service Applications that are not involved.

Without any countermeasures against this type of logic fault, it is impossible to allow network operators and/or third parties to have access to the SCP/SMP for service programming.

SUMMARY OF THE INVENTION

The invention is based on the object of making it possible for network operators and/or third parties, for example, software houses, to implement their service ideas directly and without passing via the network suppliers, and at the same time to ensure that faulty Service Applications implemented in such a way have no negative effects.

In an embodiment of the present invention, an operational environment system on a communication network is disclosed which includes an Application Programming Interface (API) which has function modules accessible by network operators and/or third parties for programming purposes, a Service Application Program (SAP) which is programed into the API via the function modules, and a monitoring system which checks at predetermined times whether the SAP is operating logically correctly and which deactivates the operation of the SAP upon an incorrect operation.

In an embodiment, the operational environment system further includes one or more events transmitted by the communication network to the monitoring system and for which the SAP is waiting in a wait state, storage means in the monitoring system for storing the one or more events, and wherein the monitoring system checks whether the one or more events are logically correct taking account of the wait state of the SAP and thereafter ends the call and/or deactivates the operation of the SAP upon an incorrect operation.

In an embodiment of the operational environment system, the monitoring system checks whether it is to be expected that the communication network will still transmit events and thereafter ends the call and/or deactivates the operation of the SAP upon a finding that no events will be transmitted.

In an embodiment of the operational environment system, the monitoring system checks, if no events have been entered in the storage means, whether a context change has occurred within the SAP since a last check and thereafter ends the call and/or deactivates the operation of the SAP upon finding that no context change has occurred.

In an embodiment of the operational environment system, the monitoring system checks, if a context change has occurred with the SAP since the last check, whether the SAP has carried out at least one message interchange and thereafter ends the call and/or deactivates the operation of the SAP if the check indicates that no message interchange has occurred.

In an embodiment, the operational environment system further includes an event counter, wherein the monitoring system checks whether the event counter has overrun, if at least one message interchange has taken place since the last check, and thereafter ends the call and/or deactivates the operation of the SAP if the check indicates that the event counter has overrun.

In a further embodiment of the present invention, a method of addressing faults in an operational environment system on a communication network is disclosed which includes the steps of: providing an Application Programming Interface (API) in the operational environment system wherein the API includes function modules accessible by network operators and/or third parties; programming a Service Application Program (SAP) into the function module; providing a monitoring system in the operational environment system; using the monitoring system to check at predetermined times whether the SAP is operating logically correctly; and deactivating the operation of the SAP if the SAP is logically incorrect.

In an embodiment, the method further includes the steps of: providing storage means in the monitoring system; placing the SAP in a wait state; transmitting a plurality of events via the communication network with respect to a call to the monitoring system; storing the plurality of events in the storage means; using the monitoring system to check at predetermined times if the SAP is in the wait state and if the plurality of events are logically correct; and ending the call and deactivating the SAP if the plurality of events are logically incorrect.

In an embodiment, the method further includes the steps of: using the monitoring system to check at predetermined times if the SAP is in the wait state and if the SAP is expecting further events to be transmitted via the communication network; and ending the call and deactivating the SAP if no further events are expected by the SAP.

In an embodiment, the method further includes the steps of: using the monitoring system to check at predetermined times if the SAP is in the wait state and if a context change has occurred in the SAP since a previous check; and ending the call and deactivating the SAP if no context change has occurred.

In an embodiment, the method further includes the steps of: using the monitoring system to check if the SAP has carried out at least one message interchange if a context change has occurred; and ending the call and deactivating the SAP if no message interchange has occurred.

In an embodiment, the method further includes the steps of: providing an event counter in the operational environment system; using the monitoring system to check whether the event counter has overrun if at least one message interchange has occurred since the previous check; and ending the call and deactivating the SAP if the event counter has overrun.

Additional features and advantages of the present invention are described in, and will be apparent from, the Detailed Description of the Preferred Embodiments and from the Drawings.

DESCRIPTION OF THE DRAWINGS

FIG. 5 shows a graphical relationship between the most important events in accordance with the teachings of the present invention.

DETAILED DESCRIPTION OF THE PREFERRED EMBODIMENTS

Figure 1:
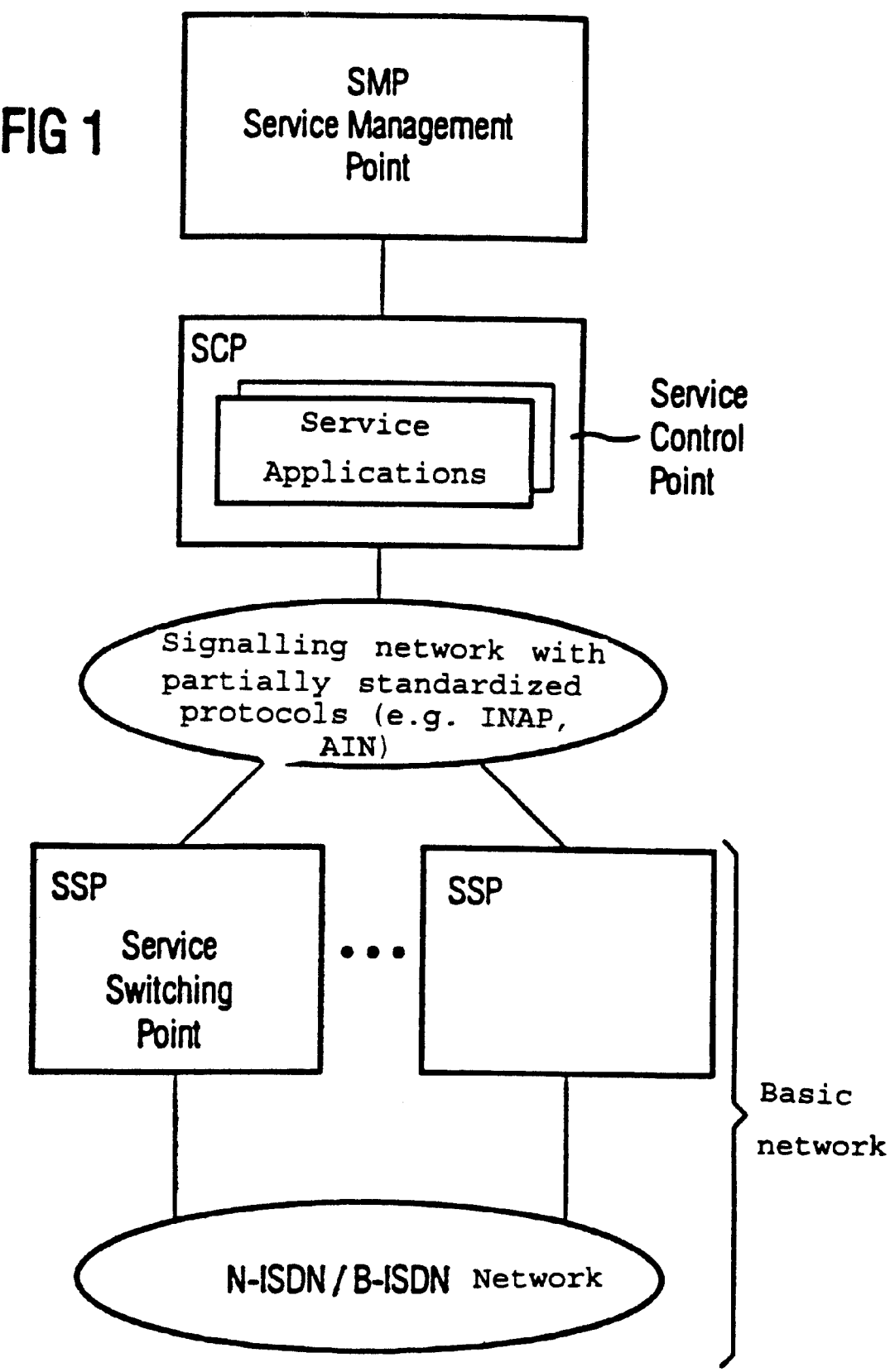
FIG. 1 shows the architecture of the known Intelligent Network in block diagram form.

FIG. 1 represents that which is known in the prior art and which has already been described in the Description of the Prior Art section of this application.

The Fault-tolerant Operational Environment (FOE) in the SCP is intended to identify the following serious logic software fault classes in the Service Applications as quickly as possible and, if required, to immediately end the processing of the calls or other network functions by the faulty Service Application:

1) Deadlock when waiting for SCP-internal resources/events and for events from the basic network
2) Endless loop
3) Active Loop With regard to other software fault classes such as address errors, memory protection contravention etc., the identification and processing are regarded as being known and will not be dealt with any further here.

Figure 2:
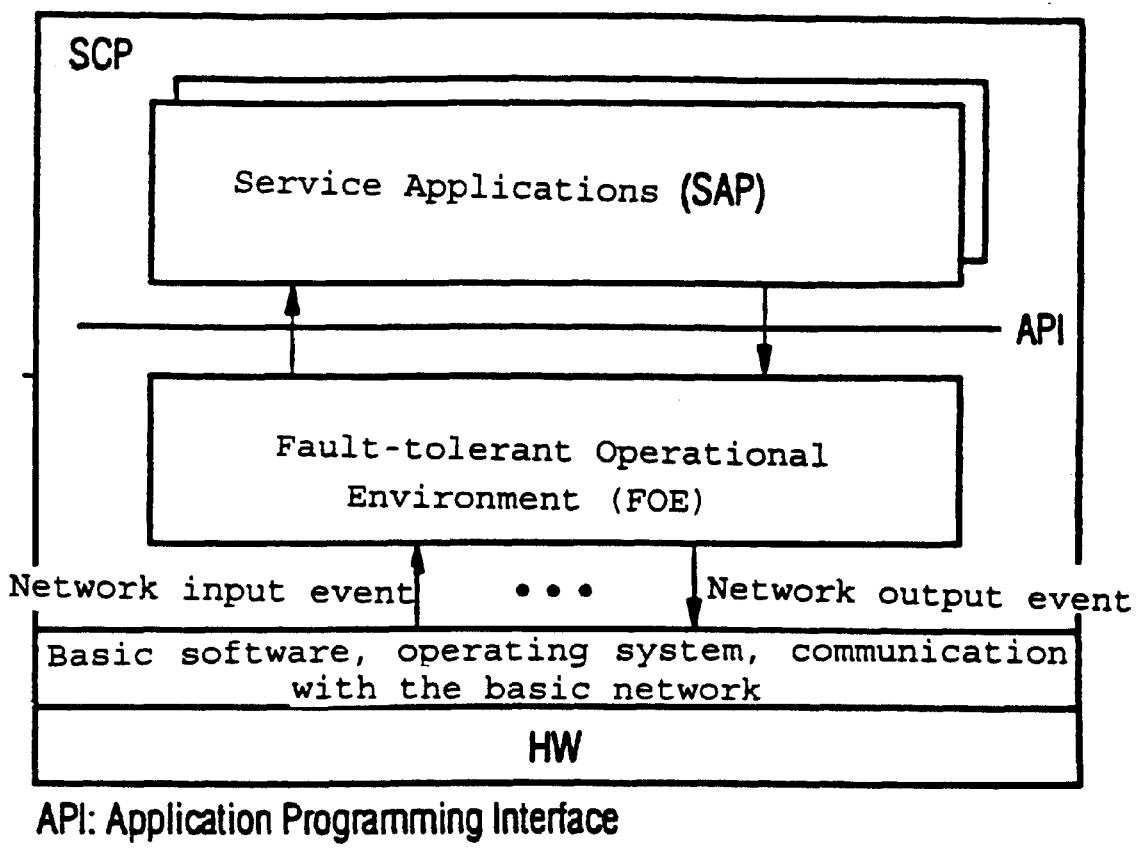
FIG. 2 shows the architecture of a service control point having a Fault-tolerant Operational Environment according to the present invention.

FIG. 2 shows an SCP architecture which includes an operational environment system FOE according to the present invention. A corresponding architecture can be used for the SMP as well.

The operational environment system FOE makes a failure-proof Application Programming Interface API available to the Service Applications SAP. The API makes a system of functional modules available to a network operator and/or to a third party, for programming an individual SAP. The FOE and API have been comprehensively tested by the system supplier, that is to say they are stable, and thus carry out the functions (considered individually) represented by the API without any faults.

Figure 3:
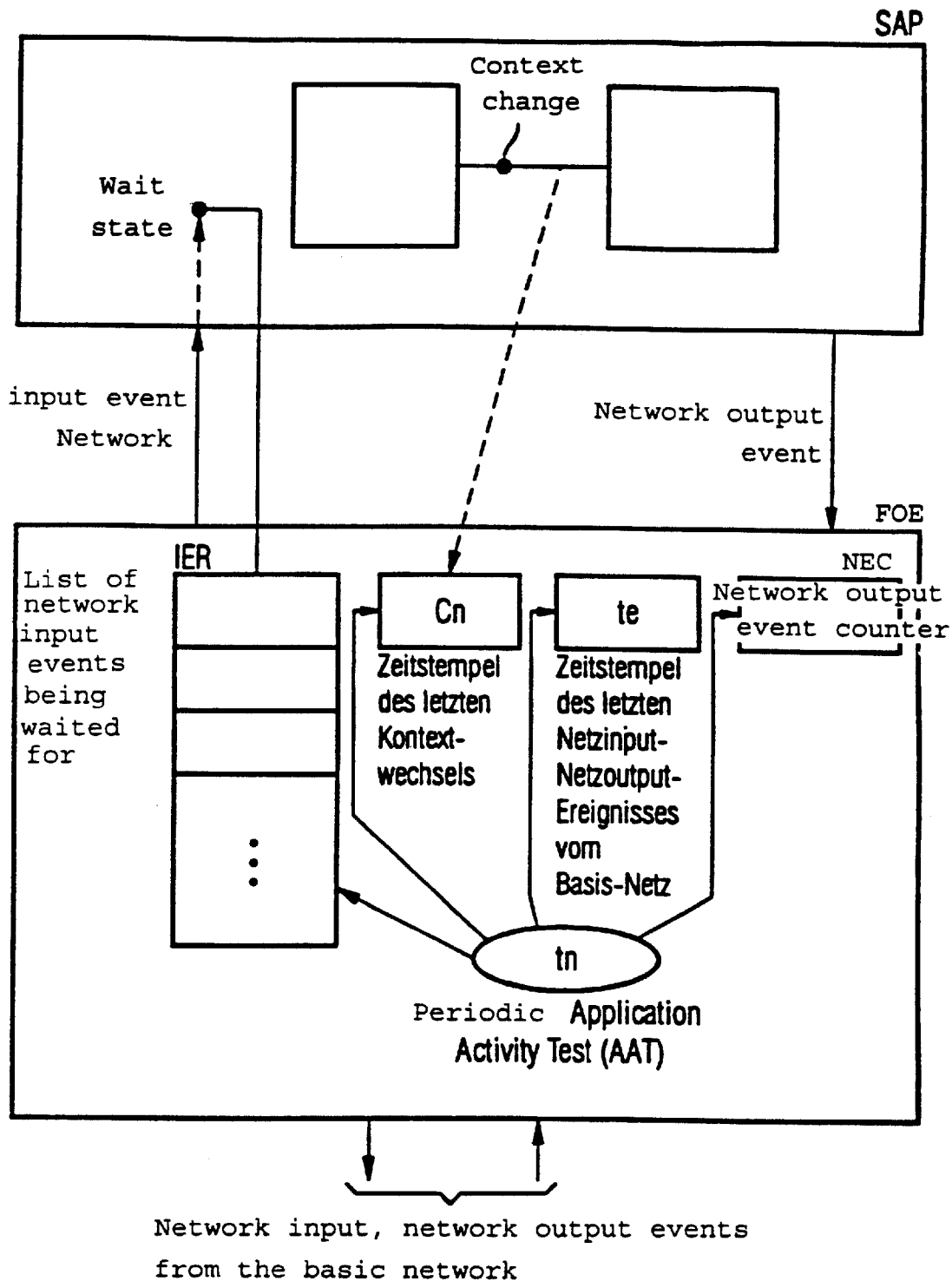
FIG. 3 shows a method in the Operational Environment System of the present invention for identifying logic software fault classes in Service Applications.

FIG. 3 shows the method in the operational environment system for identification of the logic software fault classes, namely deadlock, endless loop and active loop in the Service Applications. The method includes the following features and method steps:

1) If an activated (that is to say operating) Service Application reaches a state in which it is waiting for one or more network input events, these expected events (for example, network messages to be received in accordance with a known IN application protocol such as INAP or AIN) are entered together with their identification in a so-called event list IER in the FOE. If said Service Application initiates this wait state, the events corresponding to this state are removed by the FOE from the event list IER.

2) Whenever a context change takes place between two SAP-internal functions, a timestamp (context change timestamp Cn) for this event is stored by the FOE. Context changes include, for example, method call of an object in an object-orientated software architecture, procedure call including Remote Procedure Call (RPC), transmission/processing of an internal/external message, The context change events are normally identified by the subordinate operating system and are processed in the operational environment system with respect to the relevant Service Applications. The context change timestamp allows the FOE to assess the activity of an SAP.

3) A timestamp te for the last network input event received from the basic network or for the network output event admitted to the basic network, the significance of which timestamp will become clear later, is likewise stored by the operational environment system.

4) The operational environment system maintains an event counter NEC for each network output event. All the possible network output events and the maximum number of them are well defined in a given basic network protocol (for example in accordance with the INAP, AIN international standards).

5) The operational environment system periodically initiates an Application Activity Test AAT. The variable time period is fixed in the operational environment system as a timestamp tn.

Figure 4:
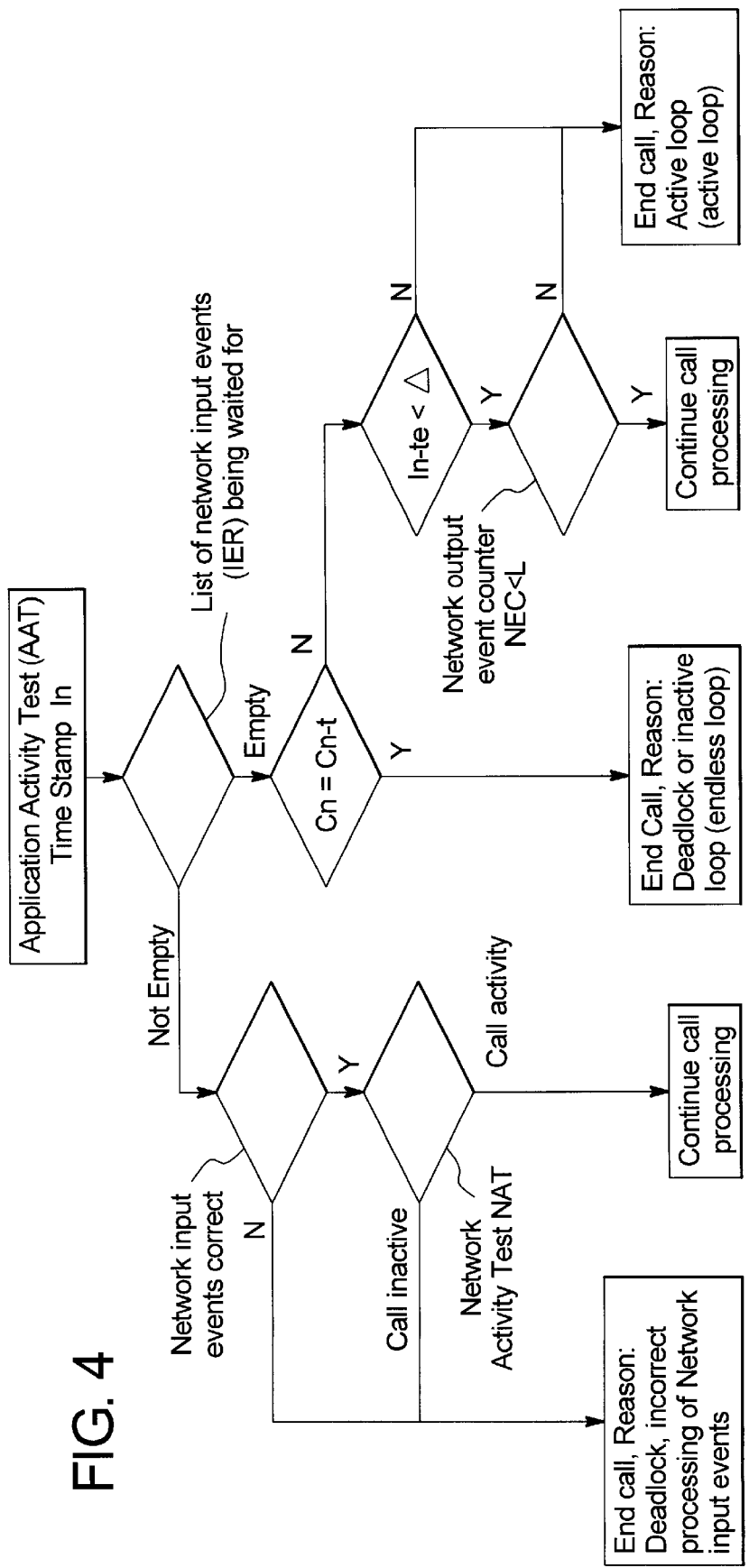
FIG. 4 shows a method in the Operational Environment System of the present invention for identifying logic faults in Service Applications.

FIG. 4 shows the method used in the operational environment system for identification of the logic faults in the Service Applications.

FIG. 5 shows the relationship between the most important events associated with the method of FIG. 4.

The method illustrated in FIG. 4 is implemented as follows:

1) The method initiation event is the periodic Application Activity Test AAT.

2) At the time of the period tn of the Application Activity Test, the list IER of network input events is first of all investigated for a specific call. If this list is not empty, a check is carried out to determine whether all of the entered network input events are logically correct. This test is derived from knowledge of the standardized basic network protocol (for example INAP, AIN).

In the event of faults, the processing of the call by the associated Service Application is ended (deadlock: waiting for an event which never occurs). If, on the other hand, the network input events entered in the list IER are logically correct, a check is furthermore carried out to determine whether the basic network can transmit these network input events at all (if the call has been ended prematurely by the basic network, whose transmission, for example, is not possible). To this end, a known method is used to carry out a Network Activity Test NAT, by carrying out a test transaction that is standardized for this purpose (for example, as part of the INAP, AIN protocol). If it is found in this process that the call is still active in the basic network, the call processing is continued in the Service Application.

3) If the event list IER is empty, the timestamps Cn, Cn−1 are compared in order to check whether this Service Application has not carried out. any context changes since the last AAT period, that is to say whether Cn=Cn−1, Cn representing the context change timestamp for the period tn and Cn−1 representing the context change timestamp for the period tn−1. If this is the case, then there is either a deadlock or an inactive loop (endless loop).

4) If at least one context change has taken place (Cn>Cn−1) then a check is carried out to determine whether at least one message interchange (network input event or network output event) has taken place between the Service Application and the basic network. If no Service Application message interchange with the basic network has been observed by the operational environment system in a variable time period Δt, it is assumed that the Service Application is in a useless active loop.

5) If at least one network output event has been produced by the Service Application in the time period Δt, a check is carried out to determine whether the maximum value counter NEC which records this event has overrun its limit. If this is the case, an active loop is likewise identified, that is to say the Service Application is sending useless network output events.

6) It should be mentioned that the operational environment system also has to carry out other conventional checks, for example, a check of the correct structure and syntax of all the network events and their compatibility with call processing and the basic network. This is done using known methods, which do not need to be explained in more detail here. In the event of faults or inconsistencies of this type, the operational environment system terminates call processing in the relevant Service Application. Although the present invention has been described with reference to specific embodiments, those of skill in the art will recognize that changes may be made thereto without departing from the spirit and scope of the invention as set forth in the hereafter appended claims.

What is claimed is:

1. An operational environment system on a communication network, comprising:

an Application Programming Interface (API), the API including function modules accessible by network operators and/or third parties for programming purposes;

a Service Application Program (SAP), the SAP programmed into the API via the function modules; and a monitoring system, the monitoring system checking at predetermined times whether the SAP is operating logically correctly and deactivating the operation of the SAP upon an incorrect operation.

2. An operational environment system as claimed in claim 1, further comprising:

one or more events transmitted by the communication network to the monitoring system and for which the SAP is waiting in a wait state;

storage means in the monitoring system for storing the one or more events; and wherein the monitoring system checks whether the one or more events are logically correct taking account of the wait state of the SAP and thereafter ends the call and/or deactivates the operation of the SAP upon an incorrect operation.

3. An operational environment system as claimed in claim 1, further comprising:

one or more events transmitted by the communication network to the monitoring system and for which the SAP is waiting in a wait state;

storage means in the monitoring system for storing the one or more events; and wherein the monitoring system checks whether it is to be expected that the communication network will still transmit events and thereafter ends the call and/or deactivates the operation of the SAP upon a finding that no events will be transmitted.

4. An operational environment system as claimed in claim 1, further comprising:

one or more events transmitted by the communication network to the monitoring system and for which the SAP is waiting in a wait state;

storage means in the monitoring system for storing the one or more events; and wherein, if no events have been entered in the storage means, the monitoring system checks whether a context change has occurred within the SAP since a last check and thereafter ends the call and/or deactivates the operation of the SAP upon finding that no context change has occurred.

5. An operational environment system as claimed in claim 1, further comprising:

one or more events transmitted by the communication network to the monitoring system and for which the SAP is waiting in a wait state;

storage means in the monitoring system for storing the one or more events;

wherein, if no events have been entered in the storage means, the monitoring system checks whether a context change has occurred within the SAP since a last check and thereafter ends the call and/or deactivates the operation of the SAP upon finding that no context change has occurred; and wherein, if a context change has occurred within the SAP since the last check, the monitoring system checks whether the SAP has carried out at least one message interchange and thereafter ends the call and/or deactivates the operation of the SAP if the check indicates that no message interchange has occurred.

6. An operational environment system as claimed in claim 5, further comprising:

an event counter, wherein the monitoring system checks whether the event counter has overrun, if at least one message interchange has taken place since the last check, and thereafter ends the call and/or deactivates the operation of the SAP if the check indicates that the event counter has overrun.

7. A method of addressing faults in an operational environment system on a communication network, comprising the steps of:

providing an Application Programming Interface (API) in the operational environment system, the API including function modules accessible by network operators and/or third parties;

programing a Service Application Program (SAP) into the function modules;

providing a monitoring system in the operational environment system;

using the monitoring system to check at predetermined times whether the SAP is operating logically correctly; and deactivating the operation of the SAP if the SAP is logically incorrectly.

8. A method of addressing faults in an operational environment system as claimed in claim 7, further comprising the steps of:

providing storage means in the monitoring system;

placing the SAP in a wait state;

transmitting a plurality of events via the communication network with respect to a call to the monitoring system;

storing the plurality of events in the storage means;

using the monitoring system to check at predetermined times if the SAP is in the wait state and if the plurality of events are logically correct; and ending the call and deactivating the SAP if the plurality of events are logically incorrect.

9. A method of addressing faults in an operational environment system as claimed in claim 7, further comprising the steps of:

providing storage means in the monitoring system;

placing the SAP in a wait state;

transmitting a plurality of events via the communication network with respect to a call to the monitoring system;

storing the plurality of events in the storage means;

using the monitoring system to check at predetermined times if the SAP is in the wait state and if the SAP is expecting further events to be transmitted via the communication network; and ending the call and deactivating the SAP if no further events are expected by the SAP.

10. A method of addressing faults in an operational environment system as claimed in claim 7, further comprising the steps of:

providing storage means in the monitoring system;

placing the SAP in a wait state;

transmitting a plurality of events via the communication network with respect to a call to the monitoring system;

storing the plurality of events in the storage means;

using the monitoring system to check at predetermined times if the SAP is in the wait state and if a context change has occurred in the SAP since a previous check; and ending the call and deactivating the SAP if no context change has occurred.

11. A method of addressing faults in an operational environment system as claimed in claim 7, further comprising the steps of:

providing storage means in the monitoring system;

placing the SAP in a wait state;

transmitting a plurality of events via the communication network with respect to a call to the monitoring system;

storing the plurality of events in the storage means;

using the monitoring system to check at predetermined times if a context change has occurred in the SAP since a previous check;

using the monitoring system to check if the SAP has carried out at least one message interchange if a context change has occurred; and ending the call and deactivating the SAP if no message interchange has occurred.

12. A method of addressing faults in an operational environment system as claimed in claim 11, further comprising the steps of:

providing an event counter in the operational environment system;

using the monitoring system to check whether the event counter has overrun if at least one message interchange has occurred since the previous check; and ending the call and deactivating the SAP if the event counter has overrun.

* * * * *